United States Patent [19]
Moulton

[11] 4,001,826
[45] Jan. 4, 1977

[54] RANGE-GATED MOVING TARGET SIGNAL PROCESSOR

[75] Inventor: James A. Moulton, Santa Ana, Calif.

[73] Assignee: Rockwell International Corporation, El Segundo, Calif.

[22] Filed: May 17, 1967

[21] Appl. No.: 639,238

[52] U.S. Cl. .................................. 343/7.7
[51] Int. Cl.² .......................................... G01S 9/42
[58] Field of Search ..................................... 343/7.7

[56] References Cited
UNITED STATES PATENTS

| | | | |
|---|---|---|---|
| 2,600,193 | 6/1952 | Bell, Jr. et al. | 343/7.7 |
| 2,896,203 | 7/1959 | Wright et al. | 343/7.7 |

OTHER PUBLICATIONS

Skolnik, Merrill I., *Radar Systems*, McGraw–Hill (1962), p. 152.

*Primary Examiner*—Malcolm F. Hubler
*Attorney, Agent, or Firm*—L. Lee Humphries; Rolf M. Pitts

[57] ABSTRACT

A range-gated doppler processor, adapted for cooperation with a non-coherent receiver of a pulsed energy system and comprising a plurality of switched R-C signal-storage (integrating) networks, each switched-on for a preselected interval corresponding to a successive one of a plurality of range bins-to-be-sampled for providing a stored time-averaged signal indicative of the clutter content at such interval. Differential signal-combining means responsive to the sequential outputs of the switched R-C networks and the range trace signal provides a substantially clutter-free moving target signal for subsequent utilization. Pairs of switched R-C networks may be additionally employed in ancillary stages for compensatory signal-shaping and bandpass filtering, while a subsequent single chain of switched networks may be used for range coherent integration of the video-detected MTI signal.

20 Claims, 13 Drawing Figures

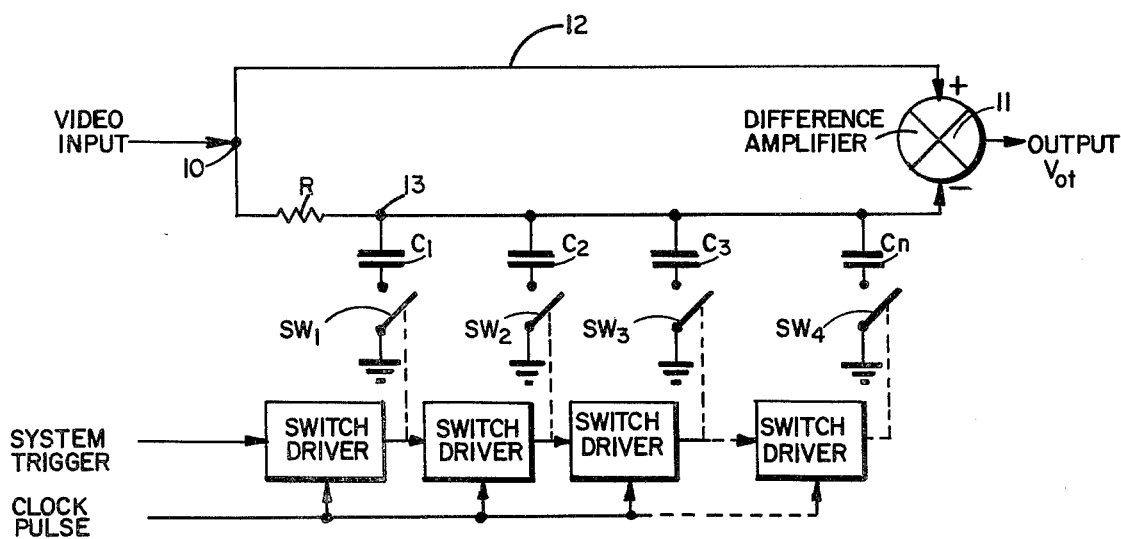
FIG. 1
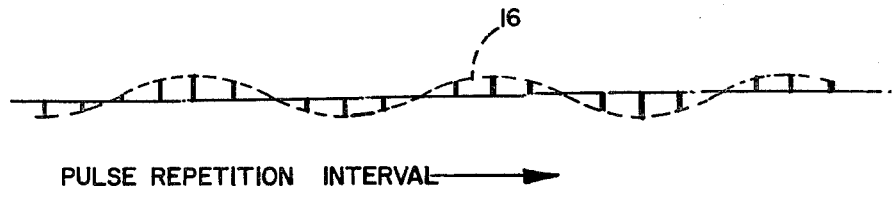
PULSE REPETITION INTERVAL ⟶
FIG. 2
INVENTOR.
JAMES A. MOULTON
BY
ATTORNEY

INVENTOR.
JAMES A. MOULTON
BY
ATTORNEY

INVENTOR.
JAMES A. MOULTON

RANGE-GATED MOVING TARGET SIGNAL PROCESSOR

CROSS-REFERENCES

1. U.S. Patent application Ser. No. 391,073 filed Aug. 18, 1964, now Pat. No. 3,408,647, by F. J. Dynan et al for AMTI Radar System.
2. U.S. Patent application Ser. No. 618,823 filed Feb. 27, 1967, now Pat. No. 3,778,828, by W. H. McFarland for Range-Gated Digital AMTI System.

BACKGROUND OF THE INVENTION

The utilization of a non-coherent doppler processor in a pulsed energy system, such as an airborne radar system for the detection of moving targets, has been described in a copending application Ser. No. 391,073 for an AMTI Radar System, filed Aug. 18, 1964, now U.S. Pat. No. 3,408,647, by F. J. Dynan et al, assignors to North American Aviation, Inc., assignee of the subject invention. The display of a substantially clutter-free moving target by means employing such non-coherent doppler processor, relies on the presence of a substantial clutter content in the received signals, which gives rise to a clutter-referenced moving target signal which may be spectrally distinguished from the d-c, or low frequency, energy of the detected clutter content. For such purpose, a high-pass analog-doppler filter is employed, having an upper corner frequency (or cut-off frequency) not exceeding one-half the pulse repetition rate of the pulsed energy system employing such device.

Such prior-art arrangement has several inherent disadvantages. First, the doppler processor requires a substantial storage medium for storing a plurality of successive range trace signals (several hundred or more) for creating a data matrix of range-bin versus pulsed interval, in order that the data in a given bin may be sequentially scanned (in the same sequence as the occurrence of the pulse intervals in which the data were recorded), for reconstructing the clutter-referenced moving target spectra. Secondly, the fixed bandpass of the analog doppler filter means may respond to the clutter spectra, as the bandwidth of the clutter spectra spreads with increases in platform velocity and with changes in look-angle (in a scanning system); while a moving target may not be detected, even though spectrally distinguishable from the clutter and below the fixed bandpass of the high-pass doppler filter. The blind speed effects imposed by the use of fixed bandpass filters may be relieved to some extent by the use of filter chains comprising severally switchable narrow-bandpass filters for covering a doppler bandpass of interest, as described in the above-noted co-pending application Ser. No. 391,073. However, such switching of discrete portions of the bandwidth merely tends to reduce, rather than avoid such effects.

Another prior art method of cancelling the d-c or time-averaged signal level of a clutter-referenced range trace signal, involves the use of delay line cancellers, such as double-delay line cancellers, canonical-configuration comb filters and others, as described more fully in Chapter 4 of "Introduction to Radar Systems" by Skolnik, published by McGraw-Hill (1962). A common disadvantage of such delay line techniques is the reliance upon a very precise, constant system pulse repetion frequency (PRF). Also, such delay line elements require accurate calibration among them, and tend to be temperature sensitive, thereby degrading the performance results obtained by such techniques. In other words, such techniques impose serious constraints on both system and component design.

A further prior art method of doppler-processing a clutter-referenced range trace signal is the range-bin sampling of the range-trace signal by a plurality of range-gated clutter-rejection filters and processors, as shown, for example, in U.S. Pat. No. 2,600,193 to Bell and at FIG. 4.41 of "Introduction to Radar Systems" by Skolnik, published by McGraw-Hill (1962). In such arrangement, the amplitude of a sampled range-bin is stored by a gated boxcar generator circuit for processing by a bandpass limited clutter-rejection filter, and the doppler modulation frequency component is then detected, integrated and thresholded. This type of processing has several inherent disadvantages. First, larger storage capacity and therefore larger storage elements are required, limiting the applicability of micro miniaturization techniques to such processing. Also, extremely low impedances are required for the boxcar detectors in order to effect rapid charging/discharging of the storage elements, while high output impedances are required for impedance isolation in the signal storage function. In other words, considerable design complexity results in seeking to achieve satisfactory series switching of the boxcar device.

SUMMARY OF THE INVENTION

By means of the range-gated doppler filter concept of the subject invention, the above-noted shortcomings and disadvantages of the prior art are avoided.

In a preferred embodiment of the invention there is provided a periodic video signalling system such as an airborne moving target indicating type of pulsed energy ranging system. Also provided is a range-gated doppler processor, having an input terminal responsively coupled to a receiver of the pulsed energy system, and comprising range-gated signal averaging means coupled to input terminal for providing a time-averaged signal, averaged over corresponding range-gated intervals of successive range traces or system pulse repetition intervals. There is further provided d-c signal cancellation means responsively coupled to the input terminal and to the range-gated signal averaging means for providing a non-zero frequency output. Further bandpass limiting of the non-zero frequency output (moving target signal) may be achieved by the use of variable-gain range-gated signal averaging means (having a time-constant differing from that of the first mentioned signal averaging means) and differential signal combining means responsive to the magnitude of the range-gated non-zero frequency output and the magnitude of the difference between the respective time-averaged signals provided by the two range-gated signal averaging means. Also, range-coherent integration of the moving target signal may be obtained by range-gated signal integrating means responsive to the magnitude of the range-gated non-zero frequency output.

By means of the above described arrangement, doppler filtering may be accomplished in an AMTI system without the necessity of separately storing hundreds of successive range trace signals in the manner of a scan-coverter type doppler processor. Also, because the signal-averaging elements are range-gated, the time-constant selected for the signal-storage and signal integrating elements need not represent a comprise between the pulsewidth of the data to be processed and the system pulse repetition interval. Instead, the time-constants are selected from a consideration of the pulsewidth or sampled interval of the range-gated data, whereby simpler network designs may be employed. Accordingly, it is an object of the invention to provide an improved doppler processor.

It is another object of the subject invention to provide a range-gated doppler processor.

It is still another object of the invention to provide a doppler processor having improved performance and employing simplified circuits.

A further object of the invention is to provide means for conveniently adjusting the bandpass of a range-gated doppler processor.

Still a further object of the invention is to provide a doppler processor adapted for cooperation with a variable-PRF type pulsed energy system.

Another object is to provide range-gated doppler processing means having a dynamic response which is not compromised by a consideration of the pulse repetition interval of the pulsed energy system with which it cooperates.

These and further objects will become apparent from the following description, taken together with the accompanying drawings.

BRIEF DESCRIPTION OF THE DRAWINGS

FIG. 1 is a schematic diagram, illustrating one aspect of the invention;

FIG. 2 is a family of representative time-histories of several components of the clutter-canceller of FIG. 1;

In the drawings, like reference characters refer to like parts.

DESCRIPTION OF THE PREFERRED EMBODIMENTS

Figure 3:
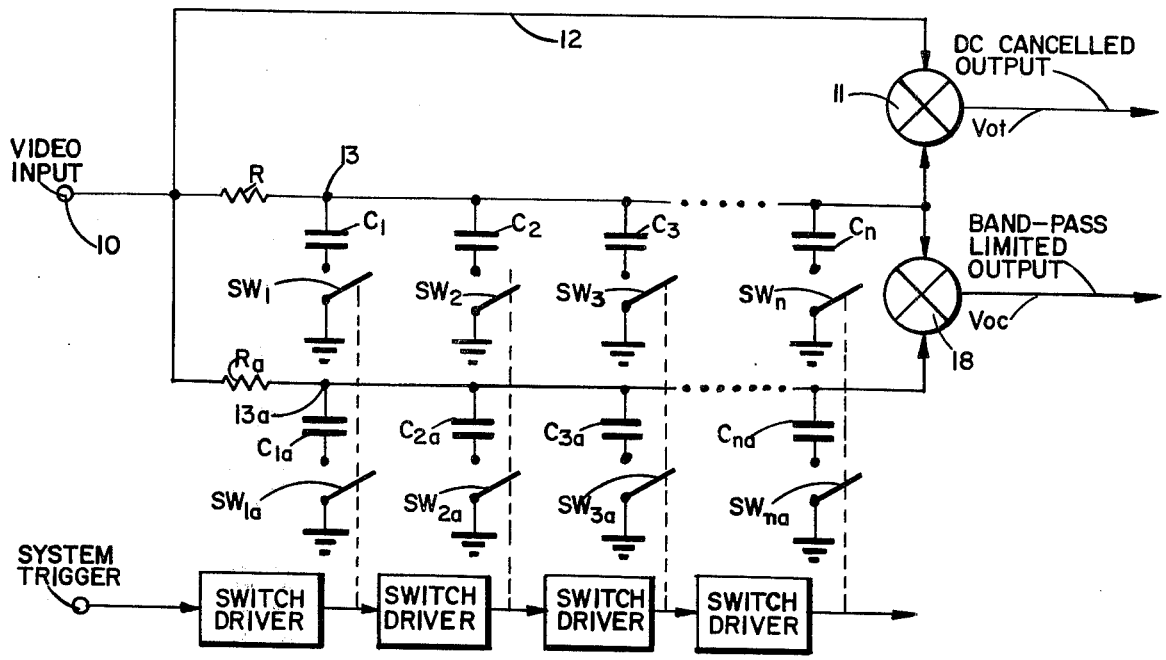
FIG. 3 is an alternate arrangement of the range-gated clutter-canceller of FIG. 1, including means for generating a bandpass limited signal.

Referring now to FIG. 1, there is illustrated a schematic arrangement of that aspect of the invention relating to a range-gated d-c canceller for cooperation with a non-coherent receiver of a pulsed energy system. There is provided a plurality of switched R-C signal storage networks, each switched on for a preselected interval corresponding to a successive one of a plurality of range-bins-to-be-sampled of a range trace signal, for providing a stored time-averaged signal indicative of the clutter content at such interval. Such R-C networks are comprised in FIG. 1 of a plurality of switched shunt capacitors $C_1$, $C_2$, $C_3$ and $C_n$ a series resistor R commonly interconnecting the switched shunt capacitors and an input terminal 10.

The switched capacitors are shown as being switched by switches $SW_1$, $SW_2$, $SW_3$ and $SW_n$ in response to switch-control inputs derived by a series of switched drivers in response to a system trigger or clock pulse of the pulsed energy system with which the device of FIG. 1 is intended to cooperate. Such switches are shown in schematic form only for convenience in exposition and are understood to comprise voltage-responsive coupling means such as switching transistors or field-effect transistors, while the chain of switch drivers may, for example, be comprised of a shift register having successive outputs connected to the switching control electrode of respective ones of switches $SW_1$...$SW_n$. The construction and arrangement of a shift register for range-gating purposes is well understood in the art, as indicated for example in U.S. Patent application Ser. No. 618,823, filed Feb. 27, 1967, now Pat. No. 3,778,828, by W. H. McFarland, assignor to North American Aviation, Inc., assignee of the subject invention.

There is also provided in the arrangement of FIG. 1 differential signal combining means 11 having a first input connected to a common terminal 13 of the switched shunt capacitors and resistor R, and having a second input coupled to input terminal 10 by line 12 for providing a substantially clutter-free range-trace signal.

The cooperation of the arrangement of FIG. 1 to provide a d-c cancelled output at each sampled range may be more easily appreciated from a consideration of FIG. 2, representing a family of time-histories of an exemplary response of the device of FIG. 1 for a representative sampled range bin or time-interval for successive samples of system pulse repetition intervals. Curve 14 represents the envelope of a clutter-referenced video receiver signal for such preselected sampled range bin and applied to input terminal 10 of FIG. 1. Such envelope is seen to describe a periodic component (corresponding to doppler-modulation frequency) and a large average, or d-c, component corresponding to the clutter-referenced clutter content. Such d-c average level (indicated as Curve 15 in FIG. 2) for the preselected gating interval, or sampled range bin, appears across the switched output of an associated one of the switchable capacitors $C_1$, $C_2$, $C_3$ and $C_n$ at terminal 12, due to the lowpass R-C filtering action at such range-bin or interval of such capacitor in cooperation with resistor R.

The difference between envelopes 14 and 15 (corresponding to the two applied inputs to differential signalling means 11 of FIG. 1) is the doppler modulation envelope shown as curve 16 in FIG. 2 and corresponds to the output of differential signalling means 11 (in FIG. 1) for the preselected range-gating interval or sampled range-bin of interest in this example. Such doppler modulation is indicative of a moving target and represents the beat frequency difference between the clutter return and moving target return echoes, being indicative of the doppler shift of the moving target signal relative to the clutter reference. The absence of a modulation envelope 16 (in FIG. 2) for a sampled range would correspond to the absence of a moving target within such range-bin. The sampling of successive range bins of a clutter-referenced video range trace signal by successive ones of the switched capacitors of FIG. 1 will provide successive signals at terminal 13 and corresponding to the signal or clutter level at each of the sampled ranges, whereby the output of differential signalling means 11 is a d-c cancelled, or clutter-free, range trace signal indicative of moving targets. In other words, the signal on terminal 13 is employed as a d-c cancellation signal.

As may be appreciated from the illustrated cooperation and description of the arrangement of FIG. 1, each of the switched capacitors is connected in circuit with the resistor R and differential signalling means 11 only during that sampled portion ($t$) of each pulse repetition interval (T) of the pulsed energy system with which the device of FIG. 1 is intended to cooperate. Therefore, the time-constant provided by the cooperation of each of the switched capacitors and the series resistor R need not be as large as those for data processing periods as long as the system pulse repetition interval. Therefore, smaller time-constants may be employed for the d-c cancellation function.

In other words, the duty cycle factor $t/T$ corresponds to a time-scale compression effected by the sampling R-C network, whereby a larger effective time-constant is achieved for a given R-C network. The lower break frequency $f_{LO}$ of the high-pass output of element 11 in FIG. 1 corresponds to:

$$f_{LO} = \frac{t}{T}\left(\frac{1}{2\pi RC_n}\right)$$

Means for providing a further limited bandpass output by means of the concept of FIG. 1 is shown in FIG. 3.

Referring to FIG. 3, there is provided elements 10, 11, 12, 13, R, $C_1$, $C_2$, $C_3$ and $C_n$, all constructed and arranged to cooperate substantially the same as the like-referenced elements of FIG. 1. There is also provided a like second plurality of switched R-C networks as the first plurality of networks, corresponding networks of the first and second plurality of networks being switched in synchronism. Such second plurality of networks comprises a series resistor $R_a$ commonly interconnecting switched shunt capacitors $C_{1a}$, $C_{2a}$, $C_{3a}$ and $C_{na}$ and input terminal 10. There is also provided second differential signal-combining means 18 having a first input coupled to terminal 13 and a second input coupled to the common interconnection 13a of resistor Ra and switched shunt capacitors $C_{1a}$, $C_{2a}$, $C_{3a}$ and $C_{na}$. The effective R-C time constant provided by each of the like networks of the second plurality of R-C networks is selected to be different from that common R-C time constant effectively provided by the first plurality, for example, being in a ratio of about 4:1, either four times larger or four times smaller than such time constant.

Figure 4:
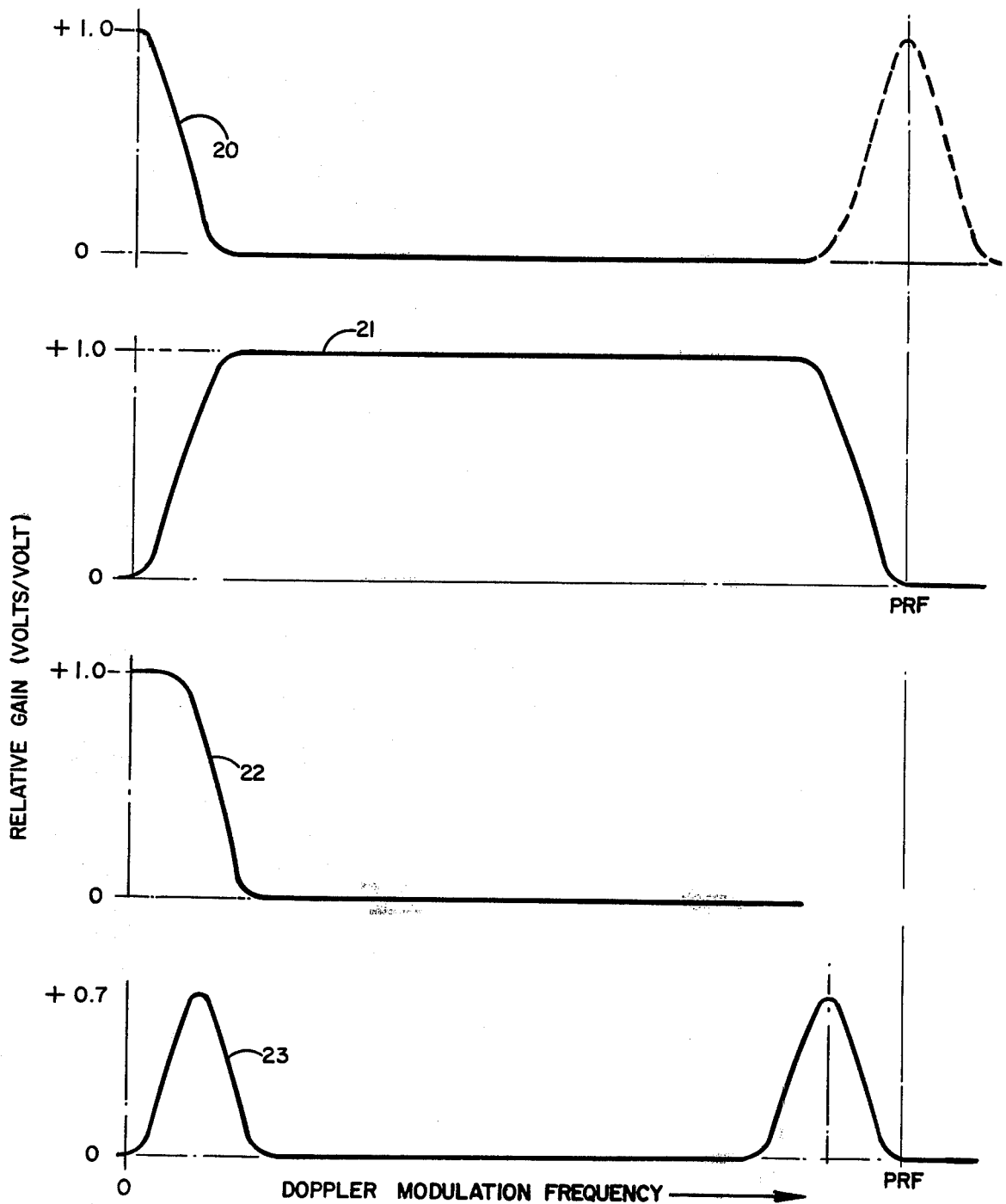
FIG. 4 is a family of frequency response diagrams of the spectral response of several components of the device of FIG. 3.

The effect of the time constant of the first plurality of networks in providing an exemplary low pass bandwidth output on terminal 13 is shown in FIG. 4 as curve 20, while an exemplary different low pass bandwidth (curve 22) for the second R-C chain is shown in FIG. 4 as been larger than that of curve 20. The response of d-c cancelling means 11 (of FIG. 1 and 3) to the combined inputs thereto is shown as curve 21 in FIG. 4, while the spectral response of second differential signalling means 18 (of FIG. 3) is shown as curve 23 in FIG. 4 (corresponding to the amplitude difference between curves 20 and 22). Although the spectral result depicted by curve 23 in FIG. 4 has been described in connection with a second time constant (curve 22) which is less than the first (curve 20), it is to be understood that a similar result may be obtained by making the second time constant larger than the first time constant.

Figure 5:
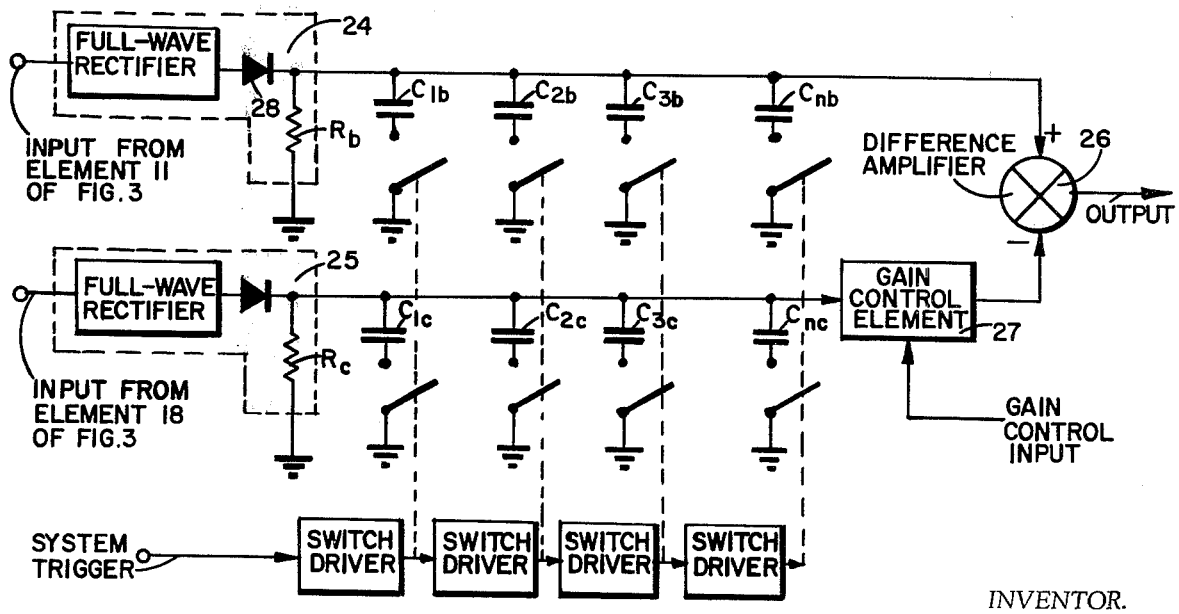
FIG. 5 is a schematic arrangement of range-gated peak detection means, cooperating with the arrangement of FIG. 3, for effecting bandpass limited doppler processing.

The response of differential signalling means 18 of FIG. 3 (curve 23 of FIG. 4) may be employed at selected gains in a peak detector device for control of the bandpass limit ordinarily provided by differential signalling means 11, as shown more particularly in FIG. 5.

Referring to FIG. 5, there is illustrated in schematic form range-gated peak detection means for distinguishing a moving target signal component from the clutter content of a clutter referenced video range trace signal. There is provided a first and a second unipolar current source 24 and 25, responsively coupled to the respective outputs of differential signalling means 11 and 18 (of FIG. 3). There is also provided a first and second like plurality of switchable shunt-connected signal storage elements as the first chain of R-C networks (of FIG. 3), corresponding ones of the signal storage elements and the R-C networks being connected to be switched in synchronism. The first plurality of switched signal storage elements $C_{1b}$, $C_{2b}$, $C_{3b}$ and $C_{nb}$ are shunt connected across the output of the first unipolar current source 24, and the second plurality of switched signal storage elements $C_{1c}$, $C_{2c}$, $C_{3c}$ and $C_{nc}$ are shunt connected across the output of the second unipolar current source 25. There is further provided differential signalling means 26 having a first input coupled to the shunted output of first unipolar source 24 and a variable-gain second input coupled to the shunted output of second unipolar source 25. The adjustable gain feature of the second input to differential signalling means 26 may be provided by a voltage-controlled attenuator 27 interposed at such input, for reasons which will be made more fully apparent hereinafter. Full-wave rectification is preferably employed in each of unipolar sources 24 and 25 in order to reduce the attenuation effects of the subsequent R-C networks on the output thereof.

In normal operation, each switched capacitor cooperates with an associated one of the unipolar current sources to store a unipolarly detected signal corresponding to a preselected one of the sampled range-time intervals. Because of the back-biasing effect of such charged capacitor upon a series blocking diode 28 in the unipolar current source, only signals of a potential greater than that stored on the capacitor are transmitted to such capacitor, whereby a peak-detecting function is performed by such capacitor for the associated sampled range-time interval or range bin. In this way, differential signalling means 26 responds only to the amplitude difference between the outputs of sources 24 and 25, and not the phase difference therebetween. Therefore, the peak-detection of a spectral component lying within bandpass curve 23 of FIG. 4 (and corresponding to a portion of the bandpass of curve 21), when differentially combined with the peak-detection of the spectrum of curve 21, results in a decrease in the doppler bandpass of the processor, as shown in FIG. 8.

Figure 7:
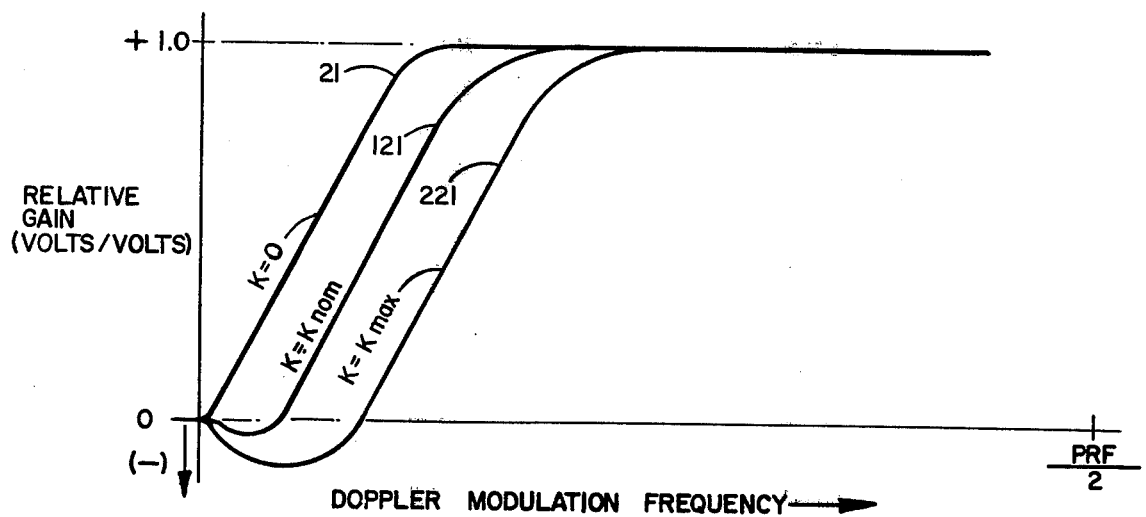
FIG. 7 is a frequency-response diagram, illustrating representive responses of the device of FIG. 5 for exemplary gain-settings.

Referring to FIG. 7, there is illustrated a family of exemplary frequency-response curves of the arrangement of FIG. 5 (in conjunction with FIG. 3) for representative gain settings of voltage-controlled attenuator 27 of FIG. 5. It is to be appreciated that curve 21 in FIG. 7, corresponding to a gain-setting of zero for attenuator 27, is the same curve as curve 21 in FIG. 4, the effect of such gain setting being to prevent the response of differential signalling means 26 (in FIG. 5) to the output of element 18 (in FIG. 3). As the gain of gain-control element 27 is increased from zero, the response of element 18 of FIG. 3 (curve 23 in FIG. 4) serves to increase the lower corner frequency of the doppler bandpass output of element 26 of FIG. 5 (curves 121 and 221 in FIG. 7), thereby reducing the bandpass thereof. In other words, a signal component commonly appearing in the bandpass of curves 21 and 23 (of FIG. 3) would tend to be cancelled at the output of differential signalling element 26 (of FIG. 5).

Figure 8:
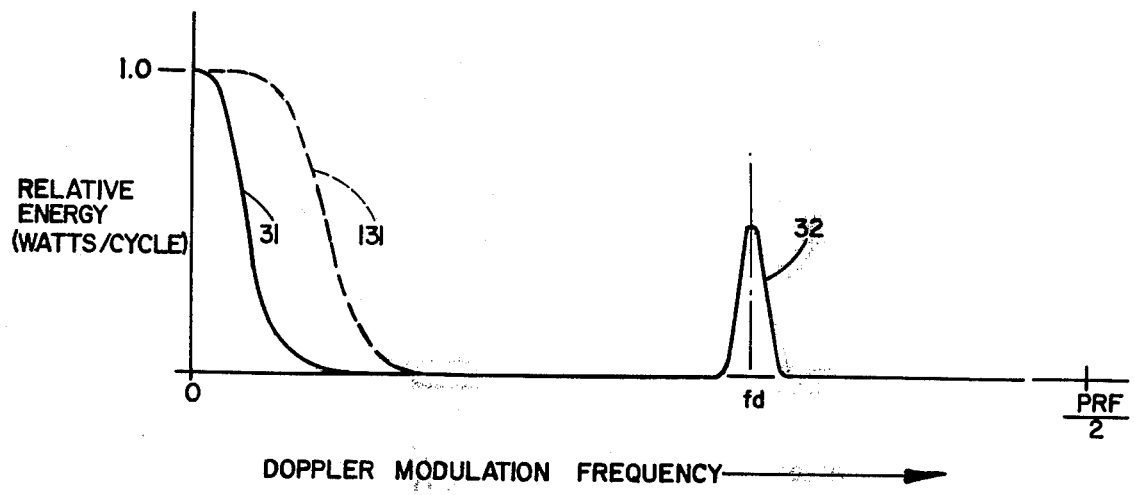
FIG. 8 is a spectral diagram illustrating the broadening of the clutter spectrum due to an increase in either platform velocity or system look-angle.

The purpose of adjusting the bandpass of the above described doppler processor is to reduce blind speed regions caused by variations of the clutter spectra associated with changes in either vehicle platform velocity $V_a$, or system look-angle $\theta$, as shown in FIG. 8. Where, for a given minimum condition of the function, $V_a \cos \theta$, resulting in a minimum clutter-referenced clutter spectrum (curve 31 in FIG. 7), a maximum doppler processor band is desired (corresponding to a curve approaching that of curve 21 for K = 0 in FIG. 7) in order to detect moving targets having a doppler modulation frequency lying just outside or immediately to the right of curve 31 in FIG. 8. However, where the function $V_a \cos \theta$ results in a spread of the clutter spectra, corresponding to dotted curve 131 in FIG. 8, the response of the doppler processor to such portion of the clutter spectrum would make difficult, if not prevent, discerning the presence or absence of a moving target (curve 32 in FIG. 8). Therefore, it is necessary to correspondingly adjust or raise the lower corner frequency of the doppler filter (corresponding to curves 121 and 221 in FIG. 7) by increasing the gain of gain control element 27 (in FIG. 5). Such bandpass control may be effected by responsively coupling a control input of element 27 to a $V_a \cos \theta$ generator, as taught, for example, in U.S. application Ser. No. 618,823 filed Feb. 27, 1967, now Pat. No. 3,778,828, by W. H. McFarland, assignor to North American Aviation, Inc., assignee of the subject invention.

Figure 6:
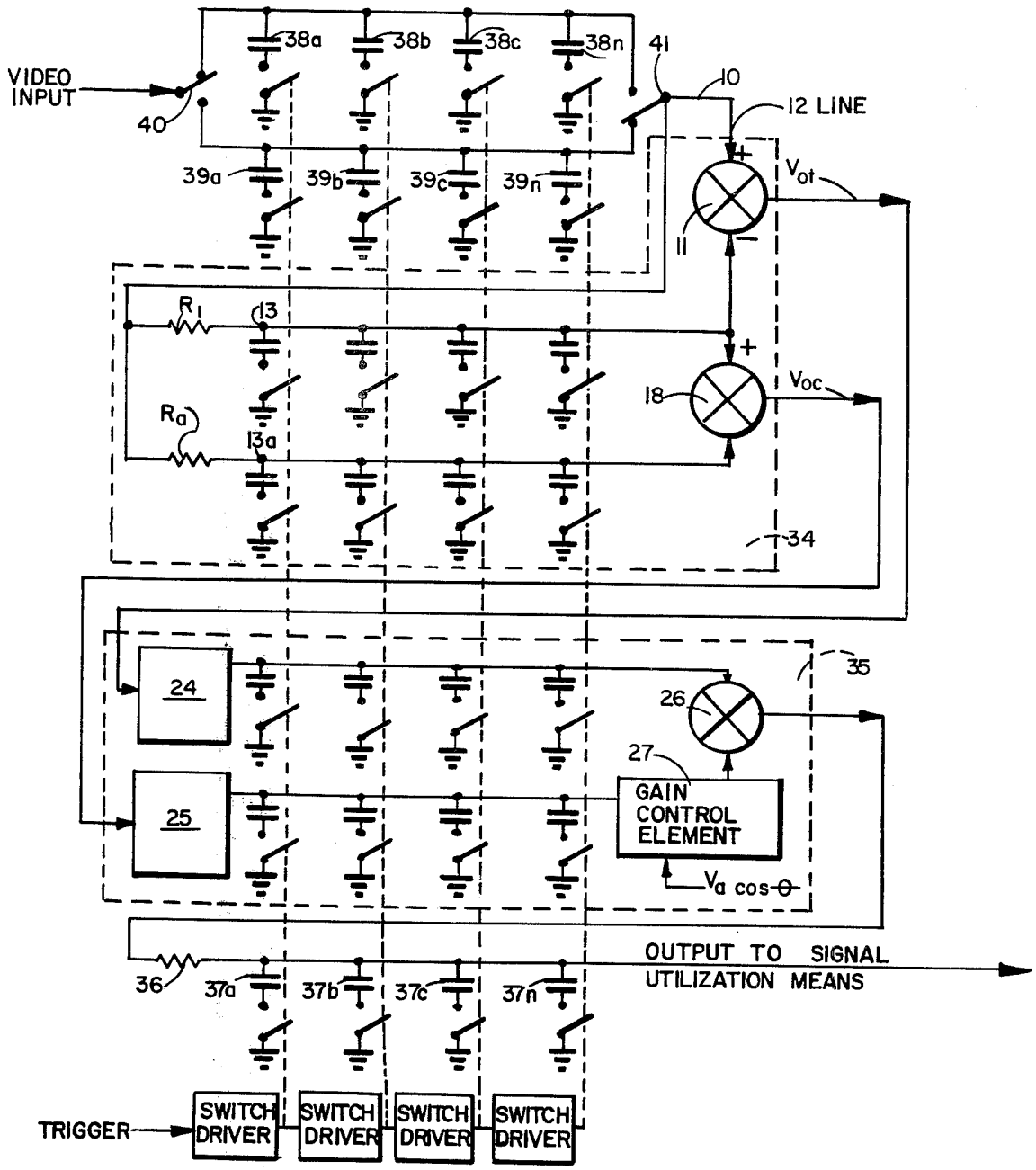
FIG. 6 is a schematic arrangement of a preferred embodiment of the inventive concept.

The performance of the above-described doppler processor may be further enhanced by the inclusion of compensatory signal-shaping and range-coherent integration, as shown more particularly in FIG. 6.

Referring to FIG. 6, there is illustrated in schematic form a preferred embodiment of the invention. There is provided a d-c canceller and bandpass limiter 34 and a variable bandpass element 35, corresponding to the illustrated arrangements of FIGS. 3 and 5. Although variable gain element 27 has been shown interposed at an input of element 26, it is to be understood that such gain element may be interposed, alternatively, at an input or output of element 18. There is also provided in FIG. 6 a range-gated range coherent integrator responsively coupled to the output of variable bandpass element 35 for integrating the moving target video signals occurring at each range over a preselected number of system pulse repetition intervals (corresponding to a preselected number of range traces). In this way, a thresholded display indicator may be enabled to provide a display having improved signal-to-noise properties. Such range coherent integrator is comprised of a series resistor 36 and a like plurality of switched integrating capacitors 37a, b, c, and n as sampled range intervals to be integrated, each capacitor being switched into circuit in synchronism with a preselected one of the sampled range-time intervals. The R-C time-constant selected for the range coherent integrator is preferably selected to be equal to at least four times the range interval sample, although other time-constants may be employed. The actual time constant selected for a particular design application is to be related to the total time on target of the antenna pattern, as is well understood in the art.

Because each integrating element of the range-gated range coherent integrator is connected in circuit for only a single range interval sample of each system pulse repetition interval, the time-constant required to effect range-coherent integration need not be so large as an integer multiple of the pulse repetition interval. Therefore, higher signal levels may be obtained from the integration of a given number of successive pulse repetition intervals by means of such lower time-constant.

Because the d-c canceller of block element 34 includes a range-gated signal averaging terminal 13 and an ungated video signalling line 12, the response of differential signalling means 11 may include wave shape differences (in the absence of compensatory signal-shaping) resulting in "spikes" or output variations due to differences between the waveforms on terminals 10 and 13. Such result, where occurring in the absence of a moving target may lead to a "false alarm" or false indication of a moving target. In order to avoid such effect, compensatory signal-shaping is interposed in the arrangement of FIG. 6, between the video input source (not shown) and input terminal 10 to block element 34.

Such signal shaping means is comprised of a like second and third plurality of switchable shunt connected capacitors (38a, b, c, n and 39a, b, c, n) as range-gated intervals, a corresponding capacitor of each plurality of capacitors being switched in synchronism with a preselected one of the sampled range-time intervals. There is also provided a first and second double throw switch 40 and 41, operated in synchronism between alternate switching states in response to the system trigger of the pulsed energy system (not shown). The first switch 40 couples an alternate one of the second and third pluralities of capacitors to the video input source (not shown) and second switch 41 couples the other of the second and third pluralities of capacitors to input terminal 10 of the range-gated processor. In this way, a range-gated range-trace signal is stored by one of the two chains of capacitors, while the other provides a previously stored, range-gated range trace signal as an input to terminal 10 in FIG. 6. Therefore, commonly range-gated signals are applied to both terminal 13 and line 12 as inputs to differential means 11, whereby false-alarms are reduced.

Figure 9:
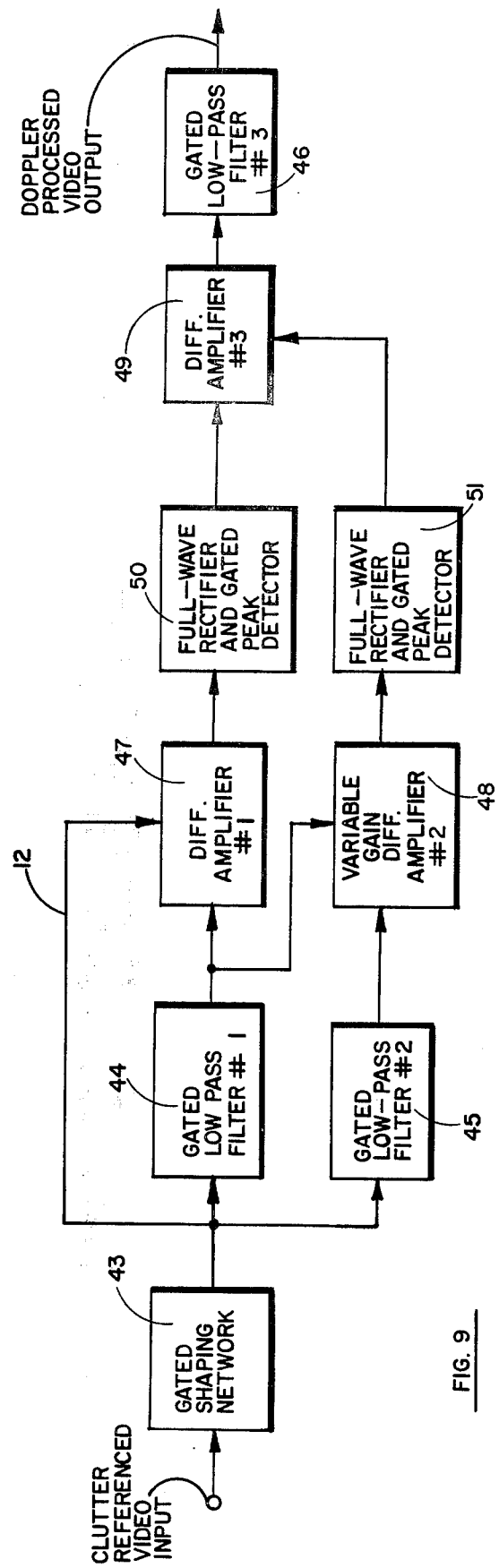
FIG. 9 is a block diagram of the arrangement of FIG. 6.

The arrangement of FIG. 6 is alternatively illustrated in block form in FIG. 9. In such block arrangement, there is provided a range-gated shaping network 43; a first, second and third gated low-pass filter 44, 45 and 46; a first, variable-gain second, and third differential amplifier 47, 48 and 49; and two full wave rectifiers with gated peak detectors 50 and 51. Network 43 corresponds to the cooperative arrangement of switches 40 and 41 with the associated switched capacitors 38 and 39 of FIG. 6. First low pass filter 44 corresponds to resistor R and the switched capacitors commonly connected to terminal 13 in FIG. 6, while second filter 45 corresponds to resistor $R_a$ and the switched capacitors commonly connected to terminal 13a in FIG. 6. First and third differential amplifier 47 and 49 respectively corresponds to respective ones of differential signalling means 11 and 26 of FIG. 6. Variable gain differential amplifier 48 corresponds to element 18 with element 27 interposed at a second input thereof. Full wave rectifier and gated peak detector 50 corresponds to element 24 and the associated switched capacitors of FIG. 6, while full wave rectifier and gated peak detector 51 corresponds to element 25 and the associated switched capacitors of FIG. 6. Gated low-pass filter 46 corresponds to the cooperative arrangement of resistor 36 and switched capacitors 37 of FIG. 6.

Figure 10:
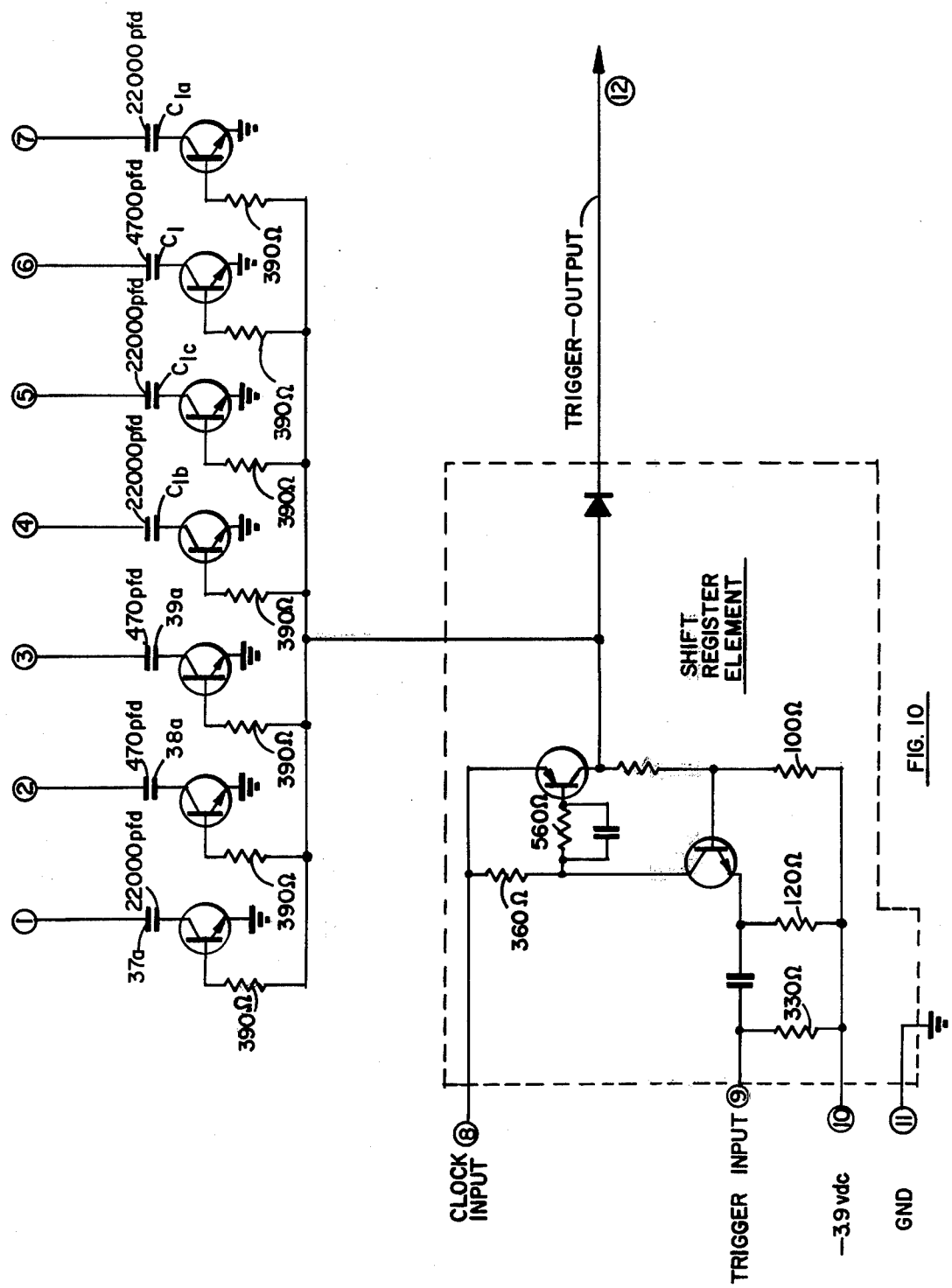
FIG. 10 is a schematic arrangement of a portion of the device of FIG. 6 for range-gate processing a single range bin.
Figure 11:
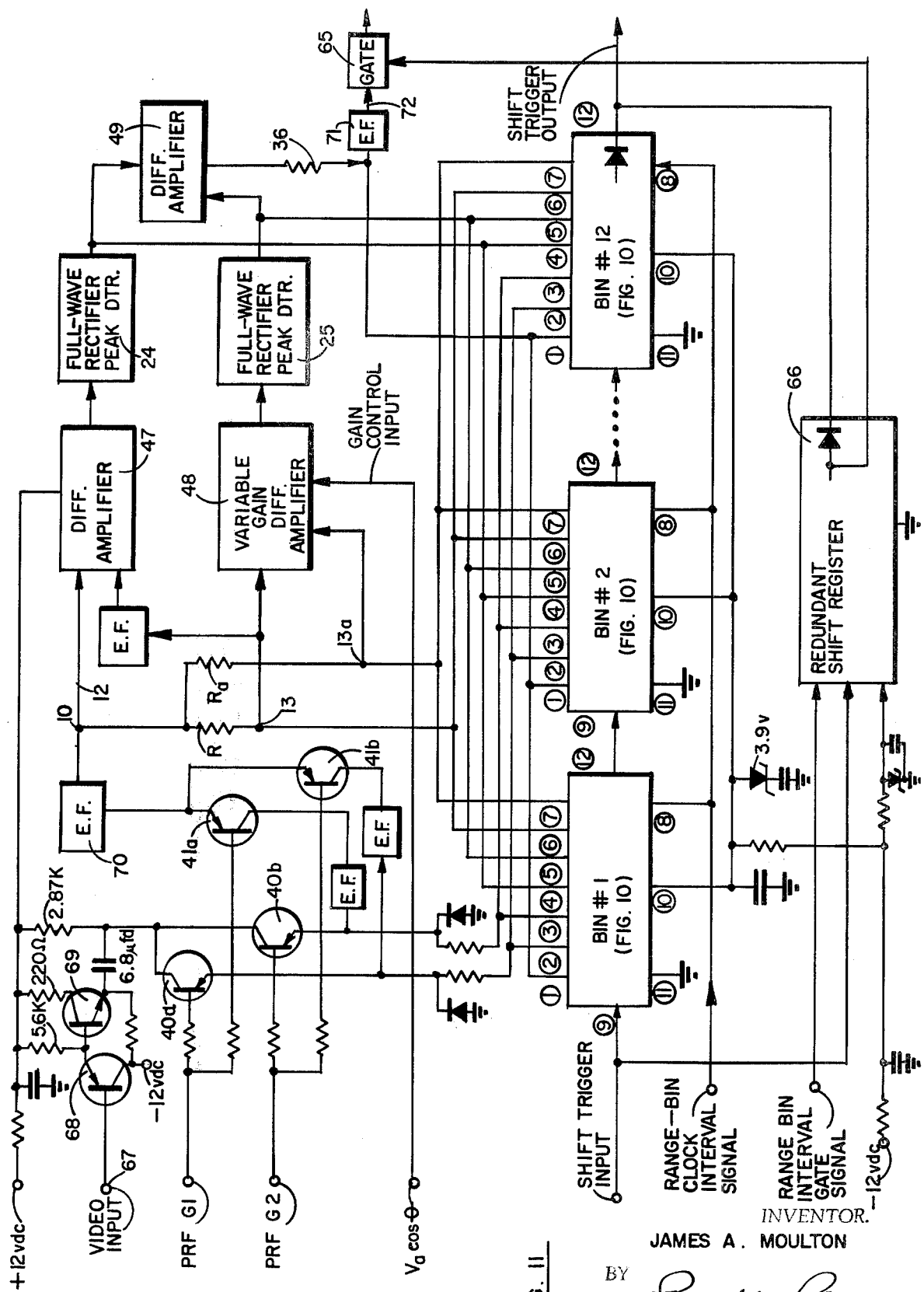
FIG. 11 is a schematic arrangement of a portion of the system FIG. 9 for processing a preselected number of contiguous range bins.

In the detail design of a practical embodiment of the doppler processor concept of the subject invention, switching transistors may be employed for the switching of the seven switched capacitors for each range bin in FIG. 6 and isolation amplifier stages employed between successive processing stages of the processor of FIG. 6, as shown more particularly in FIGS. 10 and 11.

Referring to FIG. 10, there is illustrated a preferred embodiment of the seven switched capacitors and associated shift register element (switch driver) for a single range-bin processor portion of FIG. 9. A similar arrangement would be used for the data processor for each other range-bin of interest. Terminals 1–7 are the shunt output terminals for the seven switched capacitors, as follows: terminal 1, range-coherent integration; terminals 2 and 3, compensatory signal-shaping; terminal 4, peak detection of a d-c cancelled video-envelope; terminal 5, peak detection of limited bandpass; terminal 6, first low pass (d-c canceller) network; and terminal 7, second low-pass (bandpass limiter) network. Terminal 8 is a clock input (which also serves as a B+ source) to the two-transistors shift register element from a master timer (not shown), while terminal 9 is a range-gate trigger input from the system with which the doppler processor is intended to cooperate, and may be provided by the master timer. Terminal 10 supplies a necessary B− input ( −3.9 vdc). Terminal 11 provides a common potential connection to a common electrical ground. Terminal 12 couples the output of the shift register element to terminal 9 of the shift register of the next range bin of a plurality of successive range-bin processors as shown in FIG. 11.

Referring to FIG. 11, there is shown a preferred arrangement of a portion of the processor of FIG. 9 and employing the range-bin processor of FIG. 10 for each of 12 range-bin processors. In the exemplary system of FIG. 9, a 10-mile range interval would be processed by dividing such range interval into 240 contiguous range-bins. The 240 range bin processors may be organized into successive groups of 12 contiguous range-bins, one group of which is shown in FIG. 11, each group of 12 being gated on during a preselected range interval by a gating interval signal from the master timer (not shown). In this way, the effects of interelectrode capacitance is reduced, and quality of performance is preserved. A redundant shift register 66 may be provided for alternative excitation of successive groups of range-bin processors. In this way, the failure of a shift register element (FIG. 10) for a given group of 12 doppler processors of FIG. 11 need not disable successive shift register elements outside the group of 12 with which it is associated. In other words, the effect of a resulting failure is confined to a limited range interval.

A clutter-referenced video range trance signal, applied as an input to terminal 67 of FIG. 11, is buffered by dual emitter follower stages comprising two transistors 68 and 69, prior to being compensatorily shaped by being alternately applied to terminals 2 and 3 of the 12 range bin processors by switching transistors 40a and 40b. Each of switches 40a and 40b are switched-on during mutually exclusive ones of alternate pulse repetition intervals of the radar system by switching control inputs PRF G1 and PRF G2, provided by the master timer (not shown), and hence correspond to alternate states of switch 40 in FIG. 6. The video range trace signal, stored on an alternate one of terminals 2 and 3 of the range-bin processors, is applied to terminal 10 of line 12 (via emitter-follower 70) by means of switching transistors 41a and 41b, which are switched-on during mutually exclusive ones of alternate pulse repetition intervals. Switch 41a interconnects emitter-follower 70 and terminals 3 (of the range bin processor block elements) during the interval that switch 40a couples the video input to terminals 2, while switch 41b interconnects emitter-follower 70 and terminals 2 during the interval that switch 40b couples the video input to terminals 3. In other words, switching transistors 41a and 41b correspond to switch 41 of FIG. 6.

Terminals 6 of the range-bin processors of FIG. 11 cooperate with terminal 13 of resistor R and differential amplifier and 47 and terminal 10 of emitter follower 70 to provide a d-c cancelled video range trace signal, while differential amplifier 48 cooperates with terminals 6 and 7 of the range-bin processors (of FIG. 11) and with resistors R and Ra to provide a limited bandpass output. Differential amplifier 49 cooperates with terminals 4 and 5 to provide a range-gated, peak-detected, doppler-processed output having an adjustable lower corner frequency; while the cooperation of an emitter-follower 71 with resistor 36 and terminals 1 of the range-bin processors provides a range-gated range-coherent integrated output on an output line 72. The gated doppler-processed outputs for successive groups of range-bin doppler processors may be combined by signal combining means to provide a doppler-processed range trace signal, as shown more particularly in FIG. 13. Signal-clamping may be incorporated in the output emitter follower 71 (of FIG. 11), so that an ON type signal failure within any group of range-bins will not "smear" the entire range trace signal, but will be confined to within a limited range-time interval. Alternatively, line 72 may be gated by a gate 65 in driven cooperation with redundant shift register 66.

Figure 12:
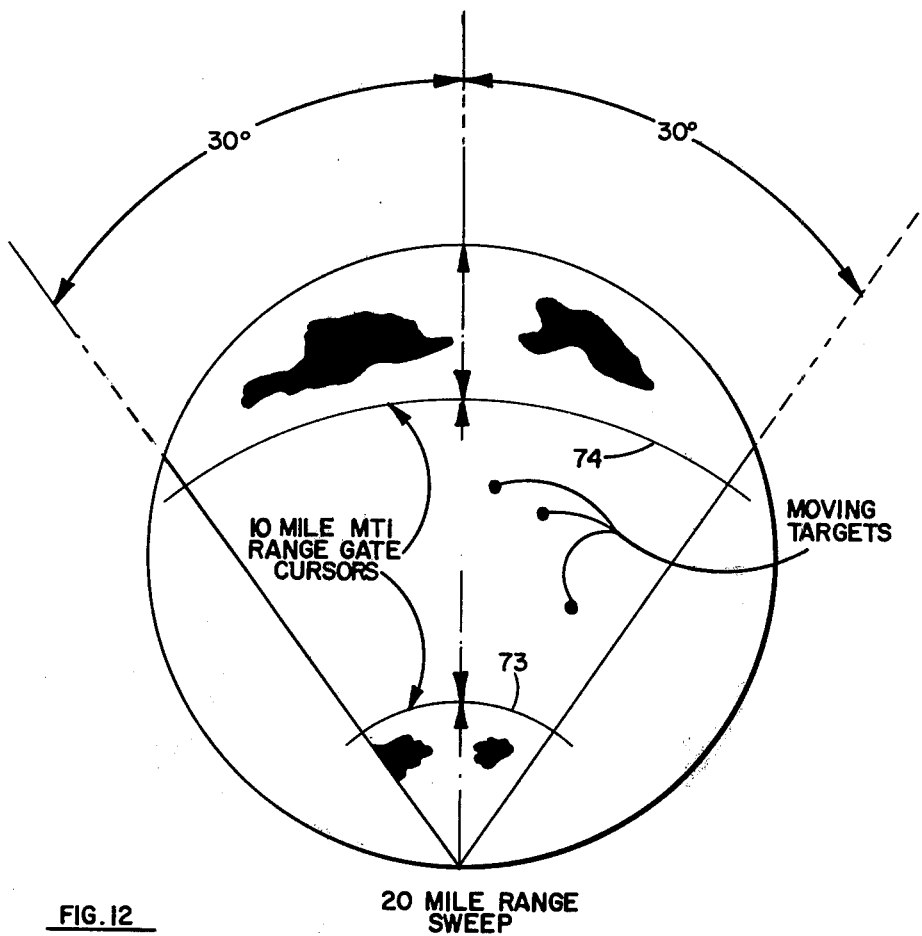
FIG. 12 is a preferred display of the data provided by a scanning system, employing the concept of the invention.

The moving target video signals provided by the doppler processor described thus far may be displayed on a PPI device to provide an indication of the direction and range of a detected moving target relative to the sensor (or radar) platform. However, such information may not be too meaningful when relayed by radio telephone to an area command center (in a military application)

due to lack of associated information as to the location of one's own vehicle (i.e., the radar platform location). Accordingly, it may be preferrable to combine a ground map display at extreme ranges (at close-range and at maximum range) on the PPI device and employ the doppler-processed video for the ranges intermediate, as shown in FIG. 12. In this way, ground map orientation is provided for the detected moving targets, and radar navigation is not completely interrupted by the AMTI mode. In the display indication of FIG. 12, range gate cursors 73 and 74 are included to demarcate the intermediate range region (in which the AMTI display mode is provided) from the extreme range limits at which a ground map display mode is provided.

Figure 13:
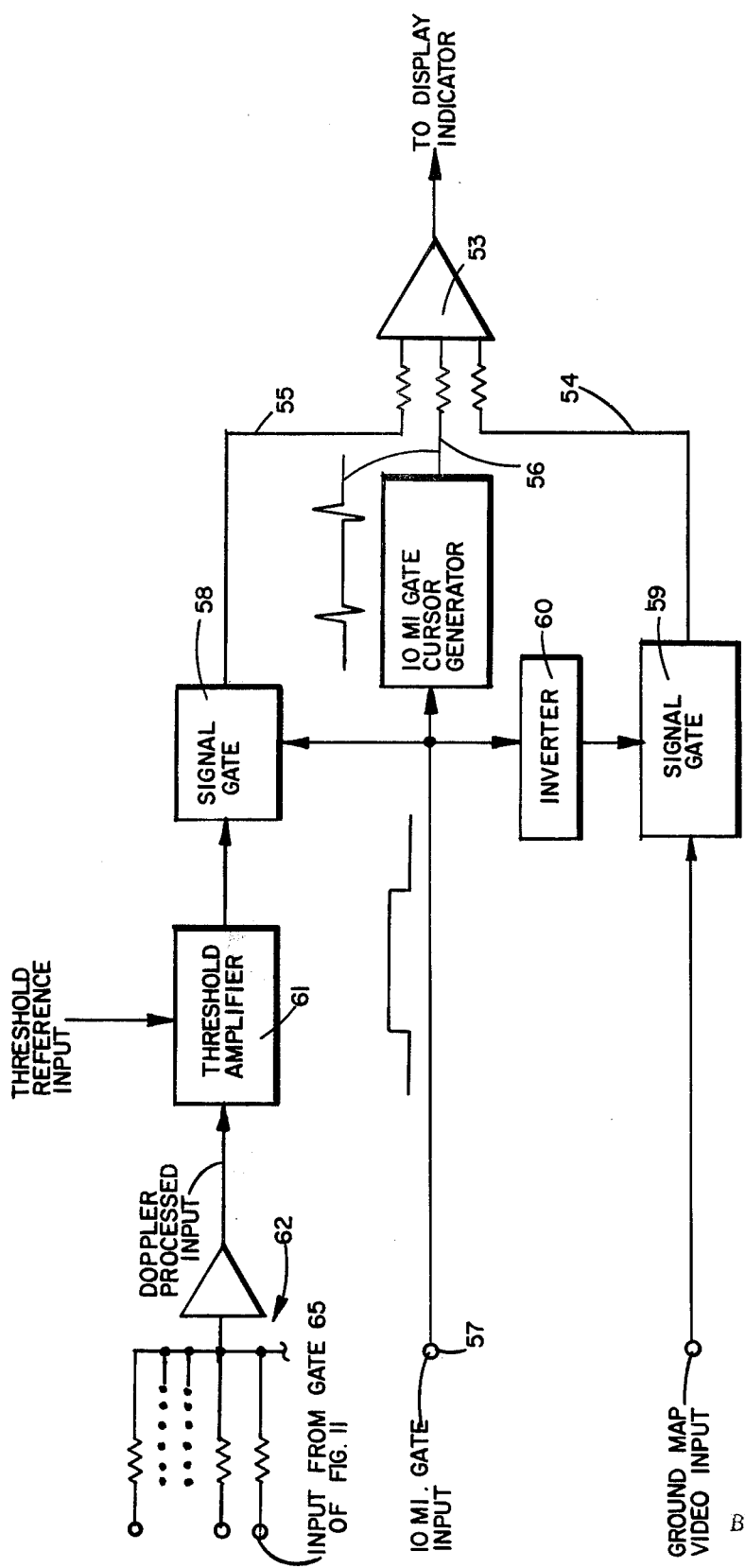
FIG. 13 is a schematic arrangement of means for cooperation with a PPI device to obtain the display of FIG. 12.

An exemplary arrangement for achieving such display is shown in FIG. 13, wherein a summing amplifier 53 responds to three gated inputs corresponding to a gated ground map video input (on line 54), a gated MTI video input (on line 55) and a cursor input signal (on line 56). A cyclical gating signal having a time phase occurrence and interval of duration corresponding to an intermediate radar range time of interest is applied to a gate control terminal 57 in response to the system trigger of the radar system by a multivibrator or other source (not shown). Such gating signal is employed to switch-on, or open, a normally closed MTI signal gate 58 interposed between the output of FIG. 6 and input 55 of amplifier 53. The gating signal is also applied to means for gating the ground map video input 54 of amplifier 53, whereby the gated states of lines 55 and 54 are mutually exclusive. Such gating means for line 54 may include a normally closed gate 59, similar to gate 58 and coupled to terminal 57 by means of a signal inverter 60. Where desired, the doppler processed input to gate 58 may be thresholded by a thresholded element 61 in order to reduce false alarms or displays of spurious signals. Also, where the system of FIG. 9, is organized into groups of range-bin processors, of the type shown in FIG. 11, signal summing means 62 may be interposed at an input of threshold means 61 and having summing inputs connected to the outputs of such groups of processors.

Accordingly, a range-gated doppler processor having an adjustable bandpass has been described. Although the device has been described in terms of sampling only four range bins, it is understood that such description is exemplary only and that the inventive concept may be adapted to provide as many contiguous range samples of a range-trace signal as desired. Also, the invention has been described in cooperation with a non-coherent pulsed energy system; however, it is clear that the device is adapted to cooperate with any clutter-referenced pulsed energy system including a velocity-compensated coherent receiver. Further, the pulse-repetition interval of the pulsed energy system need not be fixed with precision nor even fixed at all, the doppler processor of the subject invention cooperating equally well with systems having an intended variable pulse repetition rate. Moreover, the range-gating of each stage of the doppler processor allows the use of smaller time-constants, resulting in larger signal-levels, higher integrator gains, and improved signal-to-noise ratios. Therefore, an improved doppler processor has been described.

Although the invention has been illustrated and described in detail, it is to be clearly understood that the same is by way of illustration and example only and is not to be taken by way of limitation, the spirit and scope of this invention being limited only by the terms of the appended claims.

I claim:
1. A range-gated doppler processor having an input terminal and comprising
   range-gated signal-averaging means responsively coupled to said input terminal for providing a time-averaged signal; and
   first differential signal combining means responsively coupled to said input terminal and to said range-gated signal-averaging means for providing a non-zero frequency output.
2. The device of claim 1 in which there is further provided means for compensatory signal-shaping of a periodic input signal, to be applied to said input terminal, and comprising first and second range-gated memory means arranged for operation in synchronism with said range-gated signal averaging means, an alternate one of said first and second memory means being adapted for storing at least a portion of a periodic input signal and the other of said first and second memory means being connected to said input terminal during successive periods of said periodic signal.
3. The device of claim 2 in which each said memory means comprises an R-C network having a time constant much less than the time interval represented by the range-gating of said range-gated doppler processor.
4. The device of claim 1 in which said doppler processor further includes bandpass limiting means, comprising
   variable-gain range-gated signal averaging means coupled to said input terminal and operated in synchronism with said first mentioned signal averaging means and having a time constant substantially different from that of said first mentioned signal averaging means for providing a second time-averaged signal; and
   second differential signal combining means responsive to the magnitude of said range-gated non-zero frequency output and the magnitude of the difference between said first mentioned and said second time-averaged signals.
5. The device of claim 4 in which there is further included range-gated peak detection means limiting the response of said second differential signal combining means to the peak detected magnitudes of said range-gated non-zero frequency and of said difference.
6. The device of claim 1 in which there is further provided range-gated signal integrating means responsive to the magnitude of said range-gated non-zero frequency output.
7. The device of claim 6 in which said integrating means comprises an R-C network having a time constant substantially greater than the period of a range-time repetition interval of said range gated doppler processor.
8. In a non-coherent receiver of a pulsed energy system, a range-gated doppler processor comprising
   a plurality of switched R-C signal storage networks, each switched-on for a preselected interval corresponding to a successive one of a plurality of range bins-to-be-sampled of a range trace signal for providing a stored time-averaged signal indicative of the clutter content at such interval; and
   differential signal-combining means responsive to the sequential outputs of said switched R-C networks and said range trace signal for providing a clutter-free moving target signal.

9. The device of claim 8 in which said switched R-C networks comprise
- a single common input series resistor;
- a plurality of switchable output shunt capacitors; and
- switching means responsive to a system trigger of said pulsed energy system for switching a successive one of said plurality of capacitors into circuit with said resistor for a preselected interval corresponding to a successive one of said plurality of range bins.

10. The device of claim 8 in which there is provided range-coherent integration means for integrating said clutter-free moving target signal, comprising
- unipolar conductive means having an input responsive to said moving target signal; and
- a like second plurality of switched R-C signal storage networks as said first mentioned plurality, corresponding networks of said first and second plurality of networks being connected to be switched in synchronism.

11. The device of claim 8 in which there is provided peak detection means for distinguishing a moving target component from amid a range-gated clutter referenced range trace signal and comprising
- a first and a second unipolar current source responsive to said stored, time-averaged signal and said clutter-free moving target signal, respectively;
- a first and second like plurality of switchable shunt-connected signal storage elements as said R-C networks, said first plurality of signal storage elements being shunt connected across the output of said first unipolar current source and said second plurality of signal storage elements being shunt connected across the output of said second unipolar current source, corresponding ones of said storage elements and said R-C signal storage networks being connected to be switched in synchronism; and
- second-mentioned differential signal-combining means having first and second inputs respectively responsively coupled to the respective output of said first and second unipolar current source.

12. The device of claim 11 in which there is provided range-coherent integration means for integrating said clutter-free moving target signal, comprising
- unipolar conductive means having an input responsive to said moving target signal; and
- a like second plurality of switched R-C signal storage networks as said first mentioned plurality, corresponding networks of said first and second plurality of networks being connected to be switched in synchronism.

13. The device of claim 8 in which there is further provided range-gated moving target signal peak detection means comprising
- a unipolar current source responsive to said clutter-free moving target signal; and
- a like plurality of switchable shunt-connected signal storage elements as said R-C networks, said signal storage elements being shunt connected across the output of said unipolar current source, and arranged to be switched in synchronism with corresponding ones of the R-C networks.

14. The device of claim 8 in which there is further provided means for range-gated compensatory signal shaping of the range-trace output signal of the non-coherent receiver prior to doppler processing thereof and comprising
- a like first and second plurality of switchable shunt connected signal storage means as said plurality of R-C networks, corresponding ones of said elements and said networks being arranged to be switched in synchronism;
- a first and second double throw switch operated in synchronism between alternate switching states in response to a system trigger of said pulsed energy system,
- said first switch coupling an alternate one of said first and second pluralities of switched storage elements to said receiver and said second switch coupling the other of said first and second pluralities of storage elements to an input of said range-gated doppler processor.

15. The device of claim 8 in which there is further provided band-pass limiting means comprising
- a like second plurality of switched R-C signal storage networks as said first plurality of networks, corresponding networks of said first and second plurality of networks being switched in synchronism,
- second differential signal-combining means being responsive to the difference between the output of said first and second pluralities of switched networks; and
- third differential signal combining means having a first and second unidirectionally conductive input respectively responsively coupled to a respective output of said first and second differential signal combining means.

16. The device of claim 8 in which there is further provided means for range-gated compensatory signal-shaping and clutter bandpass limiting of the doppler processing and comprising
- a like first and second plurality of switchable shunt connected signal storage means as said plurality of R-C networks, corresponding ones of said elements and said networks being elements arranged to be switched in synchronism;
- a first and second double throw switch operated in synchronism between alternate switching states in response to a system trigger of said pulsed energy system,
- said first switch coupling an alternate one of said first and second pluralities of switched storage elements to said receiver and said second switch coupling the other of said first and second pluralities of storage elements to an input of said range-gated doppler processor;
- a like second plurality of switched R-C signal storage networks as said first plurality of networks, corresponding networks of said first and second plurality of networks being switched in synchronism;
- second differential signal-combining means being responsive to the difference between the outputs of said first and second pluralities of switched networks; and
- third differential signal combining means having a first and second unidirectionally conductive input respectively responsively coupled to a respective output of said first and second differential signal combining means.

17. The device of claim 16 in which is provided peak detection means for distinguishing a moving target component from amid a range-gated clutter referenced range trace signal and comprising a first and a second unipolar current source responsive to said stored, time-averaged signal and said clutter-free moving target signal, respectively;

a first and second like plurality of switchable shunt-connected signal storage elements as said R-C networks, said first plurality of signal storage elements being shunt connected across said first unipolar input of said third differential signal combining means and said second plurality of signal storage elements being shunt connected across said second unipolar input of said third differential signal combining means, corresponding ones of said storage elements and said R-C signal storage networks being connected to be switched in synchronism.

18. A range-gated doppler processor for cooperation with the receiver of a pulsed energy system and comprising seven like pluralities of separately switchable shunt-connected signal integrating elements, a corresponding element of each plurality of elements being switched-on for a preselected interval corresponding to a successive one of a plurality of range bins-to-be-sampled;

a first and second double-throw switch operated in synchronism between alternate switching states in response to a system trigger of said pulsed energy system, said first switch coupling an alternate one of a first and second plurality of said seven pluralities of switchable signal integrating elements to said receiver and said second switch coupling the other of said first and second pluralities to an output thereof;

three differential signal combining means, a first input of a first one of said differential signal combining means being connected to the output of said second switch, a first output of said second differential signal combining means being connected to a third one of said pluralities of shunt-connected signal integrating elements, a second input of each of said first and second differential signal combining means being commonly connected to a fourth one of said pluralities of integrating elements, a first and second input of said third differential signal combining means being respectively connected to a respective one of fifth and sixth ones of said pluralities of signal integrating elements;

first and second series resistors connecting a respective one of said third and fourth pluralities of signal integrating elements with the output of said second double throw switch;

a third series resistor interconnecting the seventh one of said pluralities of integrating elements and the output of said third differential signal combining means;

first unidirectionally conductive means interconnecting said fifth plurality of integrating elements and an output of said first differential signal combining means; and second unidirectionally conductive means interconnecting said sixth plurality of integrating elements and an output of said second differential signal combining means.

19. In a direction-scanning pulsed-energy system having a receiver, airborne moving target indicating means characterized by a range-gated doppler processor having an input terminal coupled to said receiver of said system and comprising range-gated signal-averaging means responsively coupled to said input terminal for providing a time-averaged signal, and differential signal combining means responsively coupled to said input terminal and to said range-gated signal-averaging means for providing a non-zero frequency output; and plan-position indicator means responsively coupled to said doppler processor for displaying moving targets detected at intermediate ranges, and further coupled to said receiver of said system for displaying non-doppler processed signals received from ranges outside said intermediate ranges.

20. The device of claim 19 in which said indicator means includes first gating means for cyclically gating-on the input from said doppler processor during a time interval corresponding to an intermediate range interval;

second gating means for gating the input from said receiver, said first and second gating means being synchronously operated in mutually exclusive states;

range-gate cursor signal generating means for generating display signals for demarcating the intermediate range interval; and display signal summing means coupled to said first and second gating means and said cursor signal generating means.

* * * * *